United States Patent Office 3,806,540
Patented Apr. 23, 1974

3,806,540
UNSATURATED CARBOXYLIC ACID ESTERS
Jacques Martel, 15 Rue Douvillez, 93 Bondy, France, and Edmond Toromanoff, 53 Rue Saint-Fargeau, 75 Paris 20 eme, France
No Drawing. Filed Apr. 28, 1971, Ser. No. 138,275
Claims priority, application France, Apr. 30, 1970, 7015909
Int. Cl. C07c 59/52
U.S. Cl. 260—486 H                         4 Claims

ABSTRACT OF THE DISCLOSURE

Novel unsaturated compounds of the formula

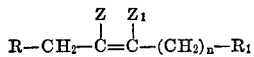

$$\text{R—CH}_2\text{—}\overset{Z}{\underset{|}{C}}=\overset{Z_1}{\underset{|}{C}}\text{—(CH}_2)_n\text{—R}_1 \qquad \text{I}$$

wherein R is selected from the group consisting of OH, Cl, Br and α-tetrahydropyranyloxy, $R_1$ is selected from the group consisting of —Cl, —Br, —CN, —COOH and —COOAlk′, Alk′ is alkyl of 1 to 7 carbon atoms, $Z_1$ and Z are hydrogen or form a third bond between the carbon atoms to which they are attached and $n$ is 2, 3 or 4 which are useful intermediates for prostaglandins and their preparation.

OBJECTS OF THE INVENTION

It is an object of the invention to provide the novel unsaturated compounds of Formula I.

It is a further object of the invention to provide a novel process for the preparation of the compounds of Formula I.

These and other objects and advantages of the invention will become obvious from the following detailed description.

THE INVENTION

The novel unsaturated compounds of the invention have the formula $$\text{R—CH}_2\text{—}\overset{Z}{\underset{|}{C}}=\overset{Z_1}{\underset{|}{C}}\text{—(CH}_2)_n\text{—R}_1$$

wherein R is selected from the group consisting of OH, Cl, Br and α-tetrahydropyranyloxy, $R_1$ is selected from the group consisting of —Cl, —Br, —CN, —COOH and —COOAlk′, Alk′ is alkyl of 1 to 7 carbon atoms, $Z_1$ and Z are hydrogen or form a third bond between the carbon atoms to which they are attached and $n$ is 2, 3 or 4.

The compounds generally fall into the following three sub groups: (A) compounds of the formula

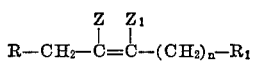

IA wherein $R_1$ and $n$ have the previous definition including 6-(α-tetrahydropyranyloxy)-1-chloro-4-hexyne,
7-(α-tetrahydropyranyloxy)-5-heptynenitrile,
7-(α-tetrahydropyranyloxy)-5-heptynoic acid and
  ethyl 7-(α-tetrahydropyranyloxy)-5-heptynoate;

(B) compound of the formula $$\text{HO—CH}_2\text{—}\overset{Z}{\underset{|}{C}}=\overset{Z_1}{\underset{|}{C}}\text{—(CH}_2)_n\text{—COOAlk′} \qquad \text{IB}$$

wherein Z, $Z_1$, $n$ and Alk′ have the previous definition including ethyl 7-hydroxy-5-heptynoate and ethyl 7-hydroxy-5-heptenoate: and (C) compounds of the formula $$\text{Hal—CH}_2\text{—CH=CH—(CH}_2)_n\text{—COOAlk′} \qquad \text{IC}$$

wherein Alk′ and $n$ have the previous definition and Hal is chlorine or bromine including ethyl 7-bromo-5-heptenoate.

The process of the invention for the preparation of compounds of Formula IC comprises condensing a bromohaloalkane of the formula $$\text{Br—(CH}_2)_n\text{—Hal′} \qquad \text{II}$$

wherein $n$ is 2, 3 or 4 and Hal′ is bromine or chlorine with tetrahydropyranyl ether of propargyl alcohol in the presence of an alkali metal in liquid ammonia to form (α-tetrahydropyranyloxy)-haloalkyne of the formula

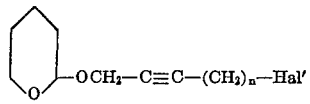

III reacting the latter with an alkali metal cyanide to form a cyano compound of the formula

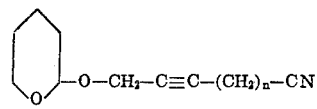

IV hydrolyzing the latter in a basic media to form an acid of the formula

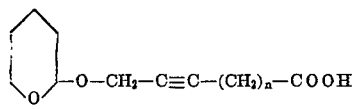

V reacting the latter with alkyl esterification agent to form an ester of the formula

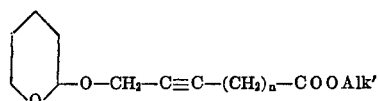

VI hydrolyzing the latter in an acid media to obtain a hydroxy compound of the formula $$\text{HO—CH}_2\text{—C≡C—(CH}_2)_n\text{—COOAlk′} \qquad \text{VII}$$

hydrogenating the latter in the presence of a partially deactivated catalyst to form a compound of the formula $$\text{HO—CH}_2\text{—CH=CH—(CH}_2)_n\text{—COOAlk′} \qquad \text{VIII}$$

and reacting the latter with a halogenation agent to obtain a compound of Formula IC.

The formation of the (α-tetrahydropyranyloxy)haloalkyne of Formula III can be considered to occur in two steps, the first step being the reaction of the alkali metal amide formed in situ in the liquid ammonia with the acetylenic compound and reaction of the resulting product with the bromohaloalkane. The preferred alkali metal is lithium.

The reaction of the haloalkyne of Formula III with an alkali metal cyanide is preferably effected with potassium cyanide in a mixture of water and dimethylformamide at 50 to 100° C. The hydrolysis of the resulting cyano compound is preferably effected with an alkali metal hydroxide such as sodium hydroxide or potassium hydroxide in an aqueous-alcoholic media.

The esterification of the acid of Formula V is preferably effected by reacting the sodium or potassium salt of the said acid with an alkyl halide such as alkyl iodide or bromide to form the ester of Formula VI or with a diazoalkane in an organic solvent such as methylene chloride, chloroform or dichloroethane or with a dialkyl sulfate in the presence of a basic agent such as sodium bicarbonate. Another method is reaction of the acid with a dialkylketal of dimethylformamide or with methanol to form the methyl ester in the presence of dimethylketal of acetone.

The hydrolysis of the ether of Formula VI is effected with a mineral acid such as sulfuric acid or phosphoric acid. The hydrogenation is preferably with palladium on a classical support such as barium sulfate partially deactivated by the addition of lead acetate, pyridine or quinoline or mixtures of two said additives.

The halogenation of the compound of Formula VIII is preferably effected with a phosphorus trihalide although good results are obtained by other methods such as reaction with thionyl chloride when the desired halogen is chlorine.

In a variation of the process, an (α-tetrahydropyranyloxy)-alkynoic acid of the formula

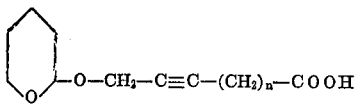
V is reacted in an acid media with an esterification agent to form the corresponding hydroxy-alkynoic acid ester of Formula VII. This is preferably effected with a lower alkanol in the presence of an acid agent such as sulfuric acid or p-toluene sulfonic acid. This modification allows the esterification of the carboxylic acid group and the hydrolysis of the tetrahydropyranyl ether in a single step and is of great commercial interest for using the said reaction.

It is also possible to prepare the alkyl hydroxy-alkynoate of Formula VII by reacting (α-tetrahydropyranyloxy)-alkynenitrile of Formula IV with hydrochloric acid in an alcohol media to form hydrochloride of the corresponding imino ether which is hydrolyzed in situ to the desired compound.

The compounds of Formula I are useful intermediates for the preparation of compounds of the prostaglandin family as described in copending, commonly assigned U.S. application Ser. No. 138,276 filed on even date herewith, by reacting an alkyl 3-(3'-tetrahydropyranyloxy-trans 1'-alkenyl)-cyclopentanone - 2 - carboxylate of the formula

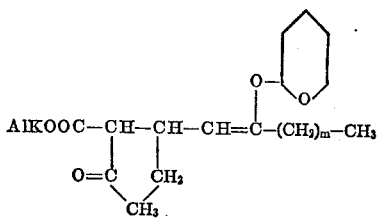
IX wherein m is 3, 4 or 5 and AlK is lower alkyl in the presence of a basic agent with an alkyl haloalkenoate of the formula

 IC wherein Hal is bromine or chlorine and Alk' is alkyl of 1 to 7 carbon atoms to obtain an alkyl carbalkoxy prostadienoate of the formula

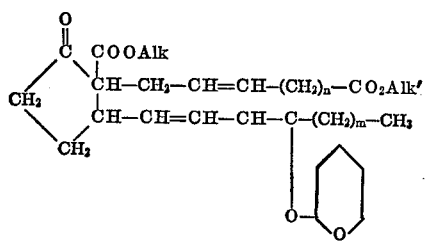
X treating the latter with an alkali metal alcoholate of the formula

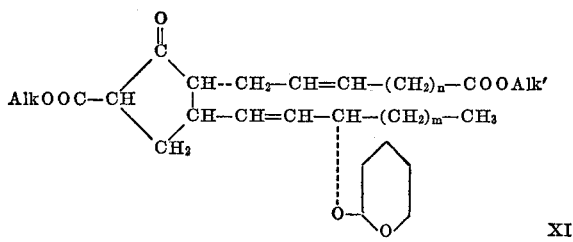
XI saponifying the latter with a basic agent to form a compound of the formula

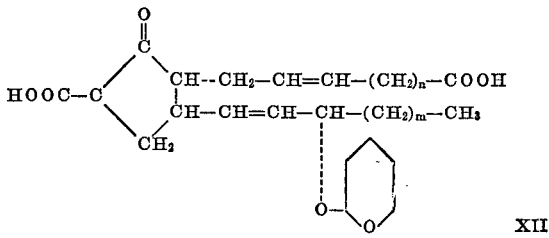
XII which can be heated to form a prostadienic acid of the formula

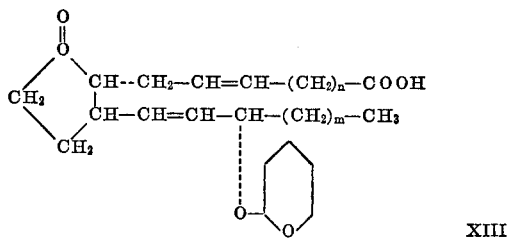
XIII which is hydrolyzed in an acid media to obtain a prostanoic acid of the formula

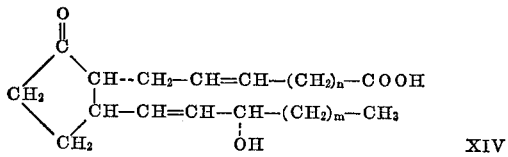
XIV

The alkyl 3-(3'-tetrahydro-pyranyloxy-trans 1'-alkenyl)-cyclopentanone-2-carboxylate of Formula IX can be prepared as described in copending, commonly assigned application Ser. No. 138,274 filed on even date herewith, by reacting proparglyacetic acid or a derivative thereof with a precursor agent for alkyl acetate to form alkyl 3-oxo-6-heptyneoate of the formula

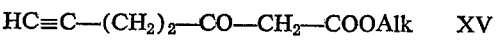 XV wherein Alk is alkyl of 1 to 7 carbon atoms, reacting the latter with an etherification agent to form alkyl 3-alkoxy-6-yne-2-heptneoate of the formula

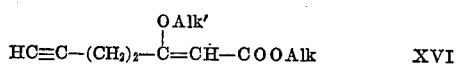 XVI wherein Alk' is alkyl of 1 to 7 carbon atoms, condensing the latter in the form of a metallic salt with a α-haloalkanal of the formula

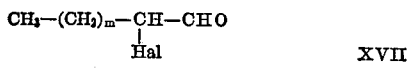 XVII wherein Hal is a bromine or chlorine and m is 3, 4 or 5 to form an alkyl 3-alkoxy-8-hydroxy-9-halo-6-alkyneoate of the formula

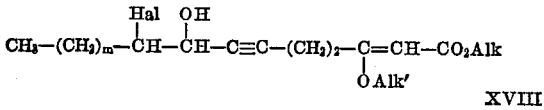 XVIII hydrolyzing the latter with an acid agent to form alkyl 3-oxo-8-hydroxy-9-halo-6-alkynoate of the formula

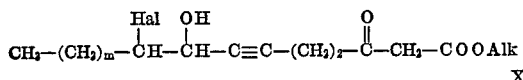
XIX hydrogenating the latter in the presence of a partially deactivated metallic catalyst to form alkyl 3-oxo-8-hydroxy-9-halo-cis 6-alkenoate of the formula

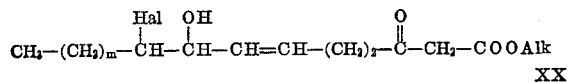
XX reacting the latter with an alkali metal alcoholate to form a trans epoxy-cis alkene of the formula

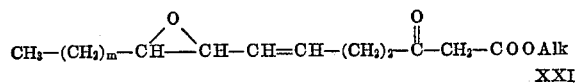
XXI reacting the latter with a secondary amine to form the corresponding enamine which is cyclized in the presence of a basic agent to form alkyl 3-(3'-hydroxy-trans 1'-alkenyl)-cyclopentanone-2-carboxylate of the formula

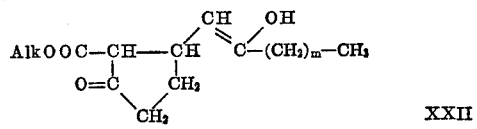
XXII and reacting the latter with an etheripcation agent to obtain the corresponding compound of the Formula IX.

In the following examples there are described several preferred embodiments to illustrate the invention. However, it is to be understood that the invention is not intended to be limited to the specific embodiments.

EXAMPLE I

Preparation of ethyl 7-bromo-5-heptenoate.—Step A: 6-(α-tetrahydropyranyloxy)-1-chloro-4-hexyne 0.77 g. of lithium in the presence of a small amount of ferric nitrate as catalyst was added to 150 cc. of ammonia cooled to —35° C. and the mixture remained in contact for 1 hour. Then, a solution of 14 g. of pyranyl ether of propargyl alcohol [produced by the process of Conia, Bull. Soc. Chim., 1955, p. 1449] in 50 cc. of ether were added thereto with stirring which was continued for 2 hours. Then, a solution of 15.7 g. of 1-chloro-3-bromo-propane in 25 cc. of ether were added thereto and the mixture was stirred for 3 hours at —35° C. The mixture was neutralized by the addition of 5.25 g. of ammonium chloride and the ammonia was evaporated off. The residue was treated with ether saturated with water, then with water and was extracted with ether. The ether phase was washed with water, dried and evaporated to dryness to obtain 13 g. of 6-(α-tetrahydropyranyloxy)-1-chloro-4-hexyne boiling at 100° C. at 0.6 mm. Hg and having a refractive index $[n]_D^{20}=1.485$. The product occurred as a colorless liquid soluble in alcohols, ether, benzene and chloroform.

As far as is known, this compound is not described in the literature.

Step B.—7-(α-tetrahydropyranyloxy)-5-heptyne-nitrile

An aqueous solution of 13.6 g. of potassium cyanide was added to 34.174 g. of 6-(α-tetrahydropyranyloxy)-1-chloro - 4 - hexyne in 75 cc. of dimethylformamide and the mixture was stirred for 8 hours at 80° C. After cooling, 100 cc. of water were added to the reaction mixture which was extracted with ether. The ether phase was washed with water until the wash waters were neutral, dried over magnesium sulfate and evaporated to dryness to obtain 23 g. of 7-(α-tetrahydropyranyloxy-5-heptyne-nitrile boiling at 115° C. at 0.1 mm. Hg and having a refractive index of $[n]_D^{20}=1.481$. The product occurred as a colorless liquid soluble in alcohols, ether, benzene and chloroform.

IR Spectrum: Presence of tetrahydropyranyloxy and CN.—As far as is known, this compound is not described in the literature.

Step C.—7-(α-tetrahydropyranyloxy)-5-heptynoic acid

A mixture of 22.5 g. of 7-(α-tetrahydropyranyloxy)-5-heptyne-nitrile, 9.5 g. of potassium hydroxide and 120 cc. of 50% ethanol was heated under a nitrogen atmosphere with stirring at 80° C. for 18 hours and then the ethanol was removed under reduced pressure. 50 cc. of water were added to the mixture which was iced and after the addition of 150 cc. of ether, the pH was adjusted to 4 by addition of iced 0.5 N hydrochloric acid. The ether phase was washed with water, dried over magnesium sulfate, filtered and evaporated to dryness under reduced pressure to obtain 21.3 g. of 7-(α-tetrahydropyranyloxy)-5-heptynoic acid in the form of a colorless liquid having a refractive index $[n]_D^{20}=1.485$. The liquid was soluble in alcohols, ether, benzene and chloroform and insoluble in water.

As far as is known, this compound is not described in the literature.

Step D.—Ethyl 7-(α-tetrahydropyranyloxy)-5-heptynoate

A mixture of 20 g. of 7-(α-tetrahydropyranyloxy)-5-heptynoic acid, 100 cc. of methanol and 5.4 g. of sodium methylate was stirred at room temperature for 1 hour and the methanol was evaporated off under reduced pressure to obtain 22 g. of sodium 7-(α-tetrahydropyranyl-oxy) - 5 - heptynoate. A mixture of 21 g. of said sodium salt and 70 cc. of dimethylformamide had added thereto 27.2 g. of ethyl bromide. The reaction mixture was heated at 80° C. for 2 hours with stirring and was then poured into water. The mixture was extracted with ether and the ether phase was washed with water, dried over magnesium sulfate and the solvent was evaporated off. The residue was fractionated to obtain 13 g. ethyl 7-(α-tetrahydropyranyloxy) - 5 - heptynoate boiling at 122° C. at 0.1 mm. Hg and having a refractive index $[n]_D^{20}=1.47$. The colorless liquid was soluble in alcohol, ether, benzene and chloroform and insoluble in water.

As far as is known, this compound is not described in the literature.

Step E.—Ethyl 7-hydroxy-5-heptynoate

A mixture of 10 g. of ethyl 7-(α-tetrahydropyranyloxy)-5-heptynoate, 20 cc. of ether, 5 cc. of 25% sulfuric acid and 20 cc. of methanol was stirred for 1 hour and then 30 cc. of water were added thereto. The mixture was extracted with ether and the ether extracts were washed with water, dried over sodium carbonate and the ether was evaporated off under reduced pressure to obtain 4.3 g. of ethyl 7-hydroxy-5- heptynoate boiling at 91° C. at 0.5 mm. Hg and having a refractive index $[n]_D^{20}=1.465$. The colorless liquid was soluble in alcohols, ether, benzene and chloroform and insoluble in water.

As far as is known, this compound is not described in the literature.

Step F.—Ethyl 7-hydroxy-5-heptenoate

A mixture of 300 mg. of 5% palladium over barium sulfate in 20 cc. of ethyl acetate was purged and a current of hydrogen was passed therethrough until 6 cc. of hydrogen were absorbed. A solution of 4 g. of ethyl 7-hydroxy - 5 - heptynoate in 7 cc. of ethyl acetate containing 0.4 cc. of quinolin was added thereto and the mixture was washed with 14 cc. of ethyl acetate. The mixture was purged and the current of hydrogen was passed therethrough until 570 cc. of hydrogen were absorbed and the mixture was filtered and the filter was washed with ethyl acetate. The organic phase was washed with 0.5 N hydrochloric acid, then with water, dried over magnesium sulfate, treated with activated carbon, filtered and evaporated to dryness to obtain 2.6 g. of ethyl 7-hydroxy-5-heptenoate. The product occurred as a colorless liquid having a refractive index $[n]_D^{20}=1.453$ and soluble in alcohols, ether, benzene and chloroform and insoluble in water.

As far as is known, this compound is not described in the literature.

Step G.—Ethyl 7-bromo-5-heptenoate

A solution of 2.9 g. of phosphorus tribromide in 30 cc. of petroleum ether was added with agitation to a mixture of 10 g. of ethyl 7-hydroxy-5-heptenoate and 120 cc. of petroleum, ether, cooled to −10° C. and the mixture was stirred for 30 minutes at −10° C. and one hour at 0° C. The reaction mixture was added to water and the mixture was extracted with ether. The ether extracts were washed with water until the wash waters were neutral, dried over magnesium sulfate and evaporated to dryness under reduced pressure to obtain 11.55 g. of an oily product. The product was purified by passage through silica gel and elution with an 85–15 mixture of cyclohexane-ethyl acetate to obtain 9.73 g. of ethyl 7-bromo-5-heptenoate in the form of a colorless liquid with a refractive index $[n]_D^{20}=1.4825$. The product was soluble in alcohols, ether, benzene and chloroform and insoluble in water.

As far as is known, this compound is not described in the literature.

EXAMPLE II

Ethyl 7-hydroxy-5-heptynoate

A mixture of 20 g. of 7-(α-tetrahydropyranyloxy)-5-heptynoic acid, 12 g. of ethanol, 50 cc. of benzene and 2 drops of concentrated sulfuric acid was refluxed under nitrogen for 3 hours and after letting the mixture return to room temperature, 20 cc. of 12.5% sulfuric acid, 30 cc. of ethanol and traces of sodium lauryl sulfate were added thereto. The mixture was stirred overnight at 20° C. and was then neutralized with sodium carbonate. The mixture was extracted with ether and the ether extracts were dried and the solvent was evaporated off under reduced pressure. The residue was rectified to obtain 8.5 g. of ethyl 7-hydroxy-5-heptynoate identical to that of Step E of Example I.

Various modifications of the products and process of the invention may be made without departing from the spirit or scope thereof and it should be understood that the invention is to be limited only as defined in the appended claims.

We claim:

1. A compound having the formula

Hal—CH$_2$—CH=CH—(CH$_2$)$_n$—COOAlk′ wherein Alk′ is alkyl of 1 to 7 carbon atoms, n is 2, 3 or 4 and Hal is chlorine or bromine.

2. The compound of claim 1 which is ethyl 7-bromo-5-heptenoate.

3. A compound of the formula

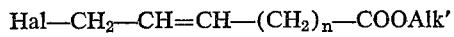
HO—CH$_2$—C≡C—(CH$_2$)$_n$—COO Alk′ wherein Alk′ is alkyl of 1 to 7 carbon atoms and n is 2, 3, or 4.

4. A process for the preparation of a compound of claim 1 comprising condensing a bromohaloalkane of the formula Br—(CH$_2$)$_n$—Hal′ wherein n is 2,3 or 4 and Hal′ is bromine or chlorine with tetrahydropyranyl ether of propargyl alcohol in the presence of an alkalimetal in liquid ammonia to form a (α-tetrahydropyranyloxy)-haloalkyne of the formula

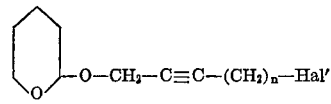

reacting the latter with an alkali metal cyanide to form a cyano compound of the formula

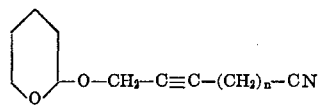

hydrolyzing the latter in a basic media to form an acid of the formula

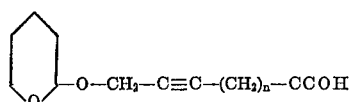

reacting the latter with alkyl esterification agent to form an ester of the formula

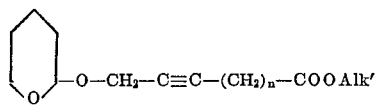

hydrolyzing the latter in an acid media to obtain a hydroxy compound of the formula HO—CH$_2$—C≡C—(CH$_2$)$_n$—COOAlk′ hydrogenating the latter in the presence of a partially deactivated catalyst to form a compound of the formula HO—CH$_2$—CH=CH—(CH$_2$)$_n$—COOAlk′ and reacting the latter with a halogenation agent to obtain a compound of claim 1.

References Cited

UNITED STATES PATENTS 3,329,707   7/1967   Klein et al. _____ 260—486 H

LORRAINE A. WEINBERGER, Primary Examiner

P. J. KILLOS, Assistant Examiner

U.S. Cl. X.R.

260—345.7, 345.8, 345. 9, 348 A, 408, 410.9 R, 465.6, 465.7, 468 K, 483, 484 R, 514 D, 535 R, 539, 633, 654

UNITED STATES PATENT OFFICE
CERTIFICATE OF CORRECTION

Patent No. 3,806,540      Dated Apr. 23, 1974

Inventor(s) JACQUES MARTEL and EDMOND TOROMANOFF

It is certified that error appears in the above-identified patent and that said Letters Patent are hereby corrected as shown below:

| Patent | | Appln | | |
|---|---|---|---|---|
| Col. | Line | Page | Line | |
| 1 | | | | Please insert --Assigned to Roussel Uclaf, Paris, France-- |
| 4 | 30 | 7 | 9 | "CH₂—CH—CH₂—CH—CH₂" (cyclic diester structure) should be [corrected structure] |
| 5 | 29 | 10 | 1 | "etheripcation" should be --etherification-- |

Signed and sealed this 1st day of October 1974.

(SEAL)
Attest:

M. GIBSON JR.
Attesting Officer

C. MARSHALL DANN
Commissioner of Patents